(12) United States Patent
Li et al.

(10) Patent No.: US 7,366,245 B2
(45) Date of Patent: Apr. 29, 2008

(54) CALIBRATION IN MIMO SYSTEMS

(75) Inventors: Qinghua Li, Sunnyvale, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 661 days.

(21) Appl. No.: 10/939,162

(22) Filed: Sep. 10, 2004

(65) Prior Publication Data

US 2006/0056532 A1 Mar. 16, 2006

(51) Int. Cl.
*H04L 27/28* (2006.01)
(52) U.S. Cl. ..................................... 375/260
(58) Field of Classification Search ................ 375/260, 375/267, 219, 224, 227, 228; 700/53; 455/101, 455/68, 136
See application file for complete search history.

(56) References Cited

U.S. PATENT DOCUMENTS 6,144,711 A 11/2000 Raleigh et al.
7,280,625 B2* 10/2007 Ketchum et al. ........... 375/343
2003/0002450 A1 1/2003 Jalali et al.
2003/0112966 A1* 6/2003 Halder et al. .......... 379/406.05
2005/0009483 A1* 1/2005 Eilts et al. .................. 455/136
2005/0227628 A1* 10/2005 Inanoglu ...................... 455/68

FOREIGN PATENT DOCUMENTS

WO WO-2004038952 A2 5/2004

OTHER PUBLICATIONS

Shelton, N. B., et al., "A robust iterative algorithm for wireless MIMO array auto-calibration", *International conference on Montréal, Quebec, Canada, Piscataway, NJ, USA*, 2, Acoustics, speech, and signal processing, 2004. proceedings. (ICASSP'04). IEEE, XP010717907, ISBN: 0-7803-8484-9,(May 17-21, 2004),341-344.
PCT/US2005/031681, PCT Search Report dated Feb. 6, 2006, 10 pages.

* cited by examiner

*Primary Examiner*—Sam K. Ahn
(74) *Attorney, Agent, or Firm*—Dana B. Lemoine; Lemoine Patent Services, PLLC

(57) ABSTRACT

Aggregate channel reciprocity in a wireless system is supported by calibrating transmitter/receiver pairs.

16 Claims, 11 Drawing Sheets

CALIBRATION IN MIMO SYSTEMS

FIELD

The present invention relates generally to wireless networks, and more specifically to wireless networks that utilize multiple spatial channels.

BACKGROUND

Closed loop multiple-input-multiple-output (MIMO) systems typically transmit channel state information from a receiver to a transmitter. Transmitting the channel state information consumes bandwidth that might otherwise be available for data traffic.

DESCRIPTION OF EMBODIMENTS

Figure 1:
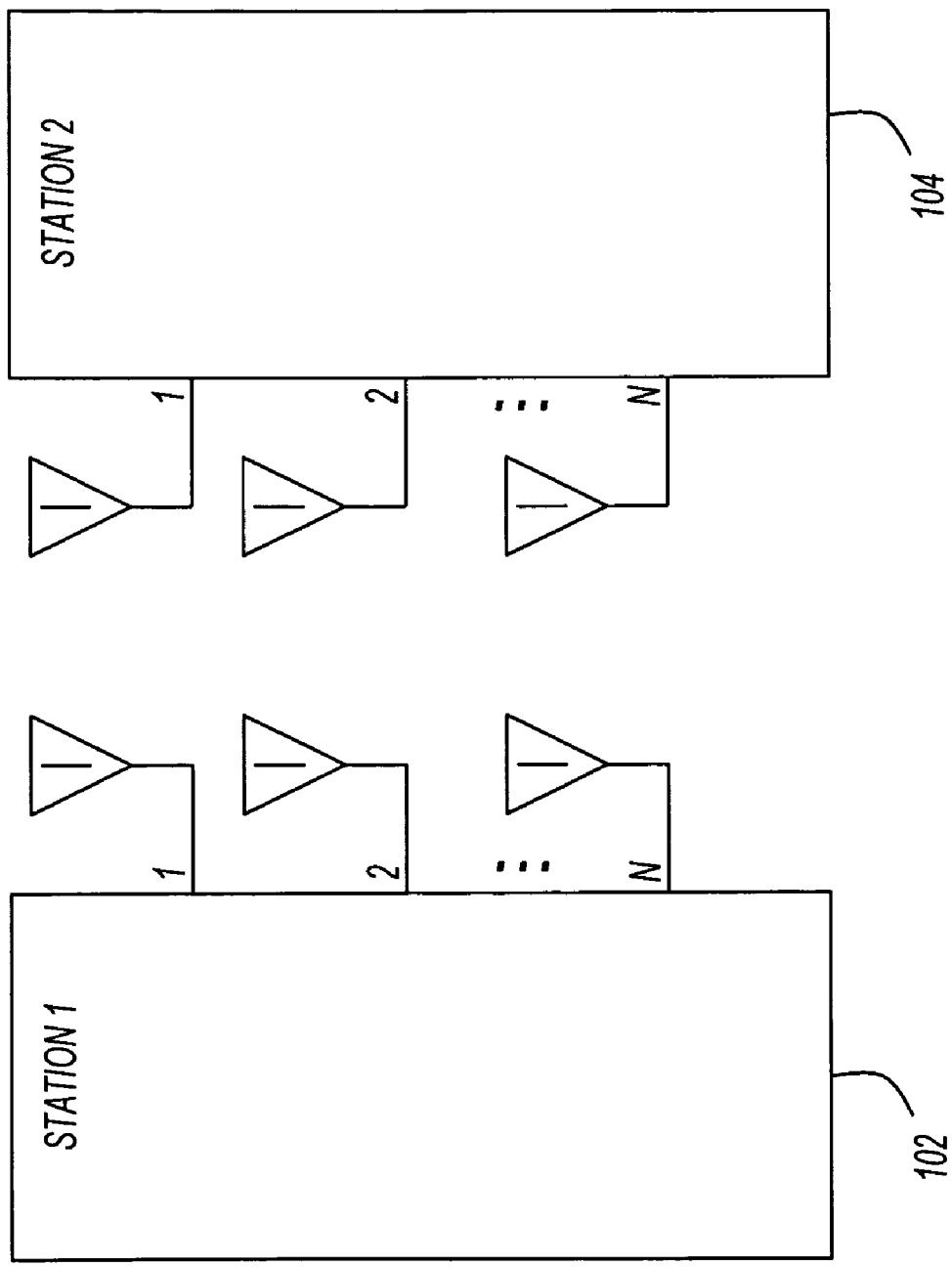
FIG. 1 shows a diagram of two wireless stations.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of two wireless stations: station 102, and station 104. In some embodiments, stations 102 and 104 are part of a wireless local area network (WLAN). For example, one or more of stations 102 and 104 may be an access point in a WLAN. Also for example, one or more of stations 102 and 104 may be a mobile station such as a laptop computer, personal digital assistant (PDA), or the like. Further, in some embodiments, stations 102 and 104 are part of a wireless wide area network (WWAN).

In some embodiments, stations 102 and 104 may operate partially in compliance with, or completely in compliance with, a wireless network standard. For example, stations 102 and 104 may operate partially in compliance with a standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition. Also for example, stations 102 and 104 may operate partially in compliance with any other standard, such as any future IEEE personal area network standard or wide area network standard.

Stations 102 and 104 each include multiple antennas. Each of stations 102 and 104 includes "N" antennas, where N may be any number. In some embodiments, stations 102 and 104 have an unequal number of antennas. The "channel" through which stations 102 and 104 communicate may include many possible signal paths. For example, when stations 102 and 104 are in an environment with many "reflectors" (e.g. walls, doors, or other obstructions), many signals may arrive from different paths. This condition is known as "multipath." In some embodiments, stations 102 and 104 utilize multiple antennas to take advantage of the multipath and to increase the communications bandwidth. For example, in some embodiments, stations 102 and 104 may communicate using Multiple-Input-Multiple-Output (MIMO) techniques. In general, MIMO systems offer higher capacities by utilizing multiple spatial channels made possible by multipath.

In some embodiments, stations 102 and 104 may communicate using orthogonal frequency division multiplexing (OFDM) in each spatial channel. Multipath may introduce frequency selective fading which may cause impairments like inter-symbol interference (ISI). OFDM is effective at combating frequency selective fading in part because OFDM breaks each spatial channel into small subchannels such that each subchannel exhibits a more flat channel characteristic. Scaling appropriate for each subchannel may be implemented to correct any attenuation caused by the subchannel. Further, the data carrying capacity of each subchannel may be controlled dynamically depending on the fading characteristics of the subchannel.

MIMO systems may operate either "open loop" or "closed loop." In open loop MIMO systems, there is no feedback transmission from the receiver to the transmitter. In closed loop systems, communications bandwidth is utilized to transmit current channel state information or conduct channel sounding between stations, and thereby reducing overall throughput. The communications bandwidth used for this purpose is referred to herein as "feedback bandwidth." When feedback bandwidth is reduced in closed loop MIMO systems, more bandwidth is available for data communications.

The current channel state information may be represented by an N×N channel state matrix, and the transmitter may process an outgoing signal using the channel state matrix or information derived from the channel state matrix to transmit into multiple spatial channels. In a straightforward implementation, the receiver sends each element of the N×N matrix back to the transmitter. This scheme involves sending $2N^2$ real numbers for any N×N complex unitary matrix, where N is the number of both transmit and receive antennas in the MIMO system.

Various embodiments of the present invention utilize "implicit channel feedback" to reduce the feedback bandwidth. For example, by taking advantage of channel reciprocity, channel state information measured in a downlink channel may be utilized for both the downlink and the uplink. The channel state information as measured in a downlink (or uplink) channel represents the aggregate response of three components, i.e., the transmit chain response of the transmitter, the wireless channel response, and the receive chain response of the receiver. The wireless channel response may be considered reciprocal without introducing great error, in part because signals traveling on the uplink and downlink travel through the same medium. The transmit chain response and receive chain response, however, may introduce mismatches that degrade the reciprocity of the aggregate channel.

Figure 2:
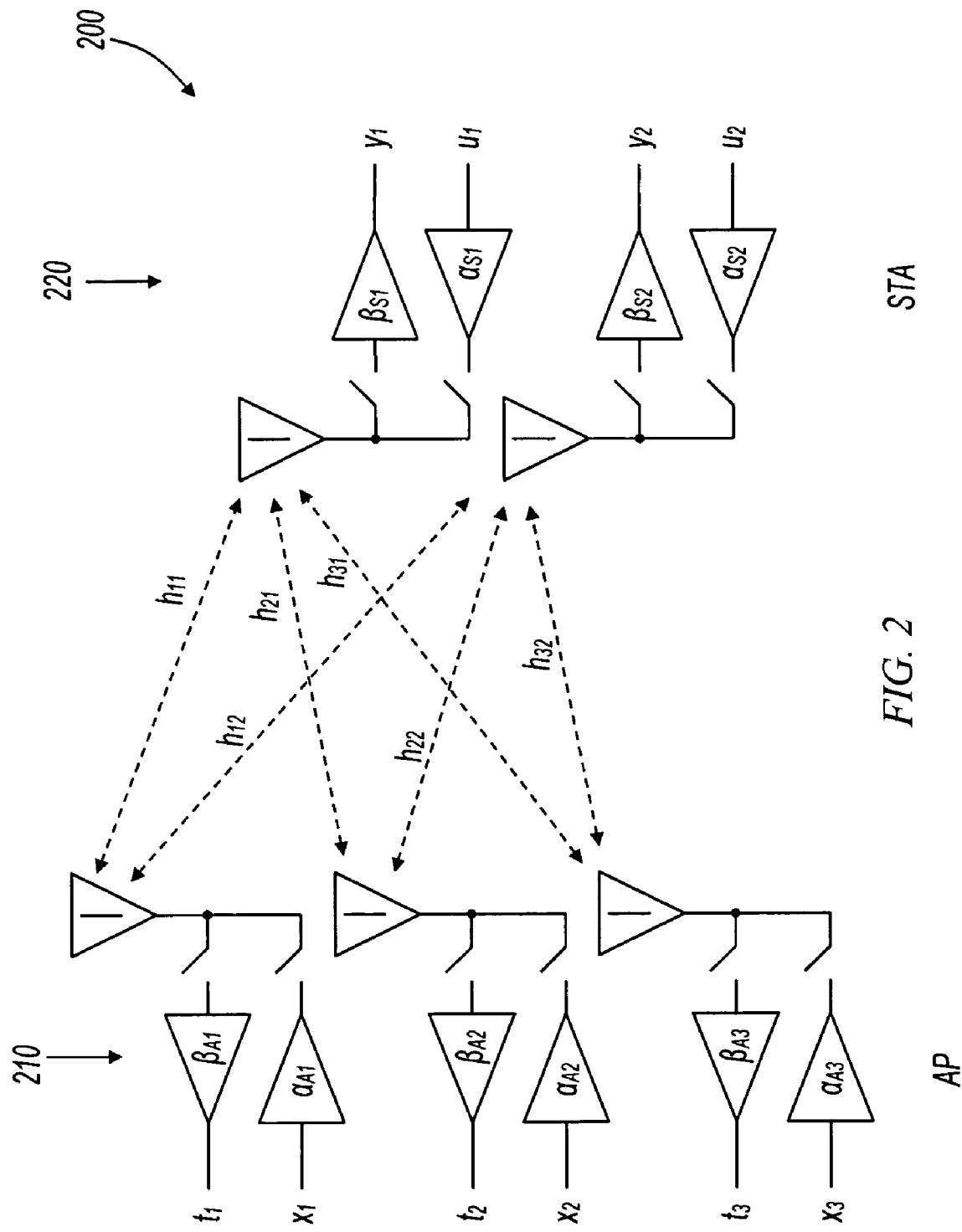
FIG. 2 shows a simplified MIMO system.

FIG. 2 shows a simplified MIMO system. System 200 includes transceivers 210 and 220. Transceivers 210 correspond to multiple transceivers in one station, such as station 102 (FIG. 1), and transceivers 220 correspond to multiple transceivers in another station, such as station 104 (FIG. 1). For example, in some embodiments, transceivers 210 may correspond to three transceivers in an access point, and transceivers 220 may correspond to two transceivers in a mobile station, although this is not a limitation of the present invention. A calibration signaling and processing algorithm to establish aggregate channel reciprocity is now described with reference to system 200. The description assumes that transceivers 210 are in an access point (AP), and that transceivers 220 are in a mobile station (STA). The signal direction from the AP to the STA is referred to as the "downlink," and the signal direction from the STA to the AP is referred to as the "uplink." These conventions have been applied to provide a framework for the description, and are not meant to limit the various embodiments of the invention.

The received signals at the station from the AP in the downlink of FIG. 2 is given by $$\begin{bmatrix} y_{S1} \\ y_{S2} \end{bmatrix} = \begin{bmatrix} \beta_{S1} & 0 \\ 0 & \beta_{S2} \end{bmatrix} \begin{bmatrix} h_{11} & h_{21} & h_{31} \\ h_{12} & h_{22} & h_{32} \end{bmatrix} \underbrace{\begin{bmatrix} \alpha_{A1} & 0 & 0 \\ 0 & \alpha_{A2} & 0 \\ 0 & 0 & \alpha_{A3} \end{bmatrix}}_{H_d} \begin{bmatrix} x_{A1} \\ x_{A2} \\ x_{A3} \end{bmatrix} \quad (1)$$

where $y_{S1}$ and $Y_{S2}$ are the received signal at the output of the station's receive chains; $x_{A1}$, $x_{A2}$, and $x_{A3}$ are the symbols sent to the stations; $\alpha_{A1}$, $\alpha_{A2}$ and $\alpha_{A3}$ are the transmit chain gains of the three AP's transmit chains; $\beta_{S1}$ and $\beta_{S2}$ are the receive chain gains of the station's receive chains. On the other hand, the received signals at the AP from a the station in the uplink of FIG. 2 is given by $$\begin{bmatrix} y_{A1} \\ y_{A2} \\ y_{A3} \end{bmatrix} = \begin{bmatrix} \beta_{A1} & 0 & 0 \\ 0 & \beta_{A2} & 0 \\ 0 & 0 & \beta_{A3} \end{bmatrix} \underbrace{\begin{bmatrix} h_{11} & h_{12} \\ h_{21} & h_{22} \\ h_{31} & h_{32} \end{bmatrix}}_{H_u} \begin{bmatrix} \alpha_{S1} & 0 \\ 0 & \alpha_{S2} \end{bmatrix} \begin{bmatrix} x_{S1} \\ x_{S2} \end{bmatrix} \quad (2)$$

where $x_{S1}$ and $x_{S2}$ are the symbols sent to the AP; $y_{A1}$, $y_{A2}$, and $y_{A3}$ are the received signal at the output of the AP's receive chains; $\alpha_{S1}$ and $\alpha_{S2}$ are the transmit chain gains of the two station's transmit chains; $\beta_{A1}$, $\beta_{A2}$ and $\beta_{A3}$ are the receive chain gains of the AP's receive chains. We define two aggregate channels, $H_d$ and $H_u$, as shown in equations (1) and (2). If the aggregate channels maintain the reciprocity, i.e., $H_d = H_u^T$, we can directly employ the estimated aggregate channel to compute singular value decomposition, and employ the result to perform transmit beamforming.

The following equations illustrate a sufficient condition to obtain channel reciprocity between an uplink and downlink with different transmit/receive chains.

$$\frac{\alpha_{A1}}{\beta_{A1}} = \ldots = \frac{\alpha_{Am}}{\beta_{Am}} = c_k \quad (3)$$

$$\frac{\alpha_{S1}}{\beta_{S1}} = \ldots = \frac{\alpha_{Sn}}{\beta_{Sn}} = b_k \quad (4)$$

where $c_k$ and $b_k$ are two constants for the k-th subcarrier; m and n are the numbers of antennas at AP and station respectively. To satisfy the conditions set forth in equations (3) and (4), various embodiments of the present invention perform calibration and compensation at both the AP and the station.

Figure 3:
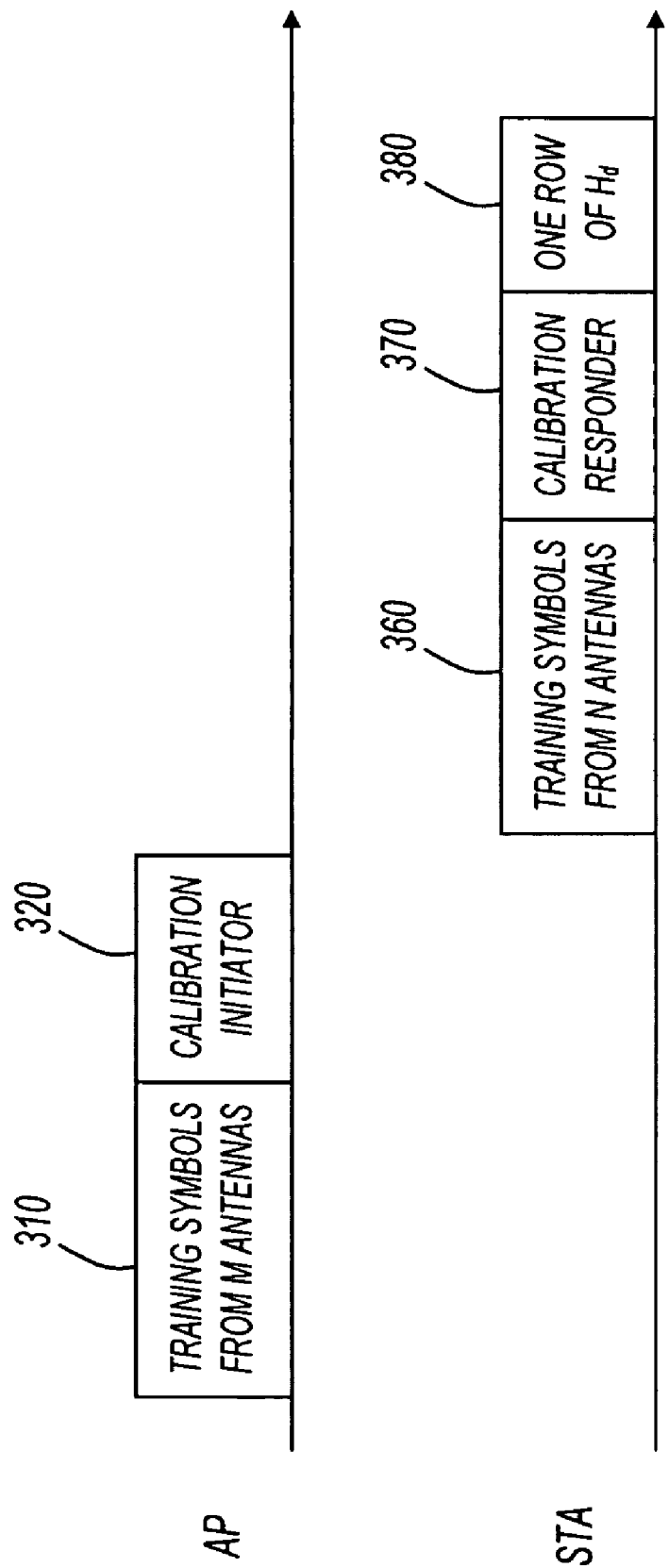
FIG. 3 shows a packet exchange sequence to support calibration of one device.

FIG. 3 shows a packet exchange sequence to support calibration of one device. For example, the packet exchange shown in FIG. 3 may be used to calibrate an access point's transmit/receive chains to satisfy equation (3). As shown at 310, the AP sends training symbols from its m antennas. In some embodiments, the training symbols may be sent one per antenna, and in other embodiments, the training symbols may be sent using antenna interleaving. A calibration initiation packet 320 may also be sent with the training symbols. The calibration initiation packet indicates that the training symbols are for calibration and requests feedback from the receiver. In the example of FIG. 3, the receiver is a station (STA). The station responds to the calibration initiation packet by sending one training symbol from one antenna (or n training symbols 360 from n antennas), a calibration responder packet 370, and one or more packets 380 having a row of the downlink response $H_d$ in (1).

In some embodiments, a STA may send back only one training symbol using one antenna. In these embodiments, the feedback row of $H_d$ has to correspond to the STA's transmit antenna. For example, if the STA sends one training symbol from its second antenna, then the feedback row is the second row of $H_d$. Further, in some embodiments, an AP with multiple transmit/receive chains may calibrate itself by communicating with a STA having a single antenna. In these embodiments, $H_d$ only has one row. Namely, one row of $H_d$ corresponds to one STA receive antenna. Equations (5)-(8) below may be utilized in embodiments with a single antenna at the STA, or a single training symbol sent from the STA.

After receiving the training symbol and the row of the downlink response $H_d$, the AP may perform calibration of the transmit/receive chains within the AP. The processing is as follows.

For the k-th sub-carrier, the element in $H_d$ and $H_u$ can be written as $$h_{ij}^d = \alpha_i^A h_{ij} \beta_j^S \quad (5)$$

$$h_{ij}^u = \beta_i^A h_{ij} \alpha_j^S \quad (6)$$

Denote $$l_{ij} = \frac{h_{ij}^d}{h_{ji}^u}; \; r_i^A = \frac{\alpha_i^A}{\beta_i^A} \text{ and } r_i^S = \frac{\alpha_i^S}{\beta_i^S}.$$

Dividing (5) by (6) gives $$l_{ij} = \frac{r_i^A}{r_j^S} \quad (7)$$

Calibration information can be computed as the ratio of receiver gain to transmitter gain for each transceiver, or $r_i^A$ for i=1, ..., m. Without loss of generality, chains 2, ..., m may be calibrated with respect to chain 1. For example, $r_i^A$ may be determined for i=2, ..., m in terms of $r_1^A$ and $l_{i1}$ for i=1, ..., m. The computation of $r_i^A$ for i=2, ..., m is as follows.

$$r_i^A = l_{i1} \; r_1^S = l_{i1}\frac{r_1^A}{l_{11}} = \frac{l_{i1}}{l_{11}}r_1^A \quad (8)$$

Similarly, the computation of $r_j^S$ for j=1, ..., n is as follows.

$$r_j^S = r_1^A/l_{1j} \quad (9)$$

Equations (8) and (9) may be used for the calibrations of the AP and station respectively. For the scheme in FIG. 3, only equation (8) is needed and therefore only one row of $H_d$ is needed to feedback from the station. The AP may adjust its receive or transmit chains according to the computed $r_i^A$ so that equation (3) is satisfied. For example, a receiver gain may be modified using an AGC circuit, a digitally controlled gain circuit, or any other suitable mechanism. Likewise, a transmitter gain may be modified by pre-processing digital data to be transmitted, controlled amplifier gain, or any other suitable mechanism. When equation (3) is satisfied, or approximately satisfied, the AP transmit/receive chains are said to be calibrated.

As described above with reference to FIG. 3, one device (the AP) is calibrated. The other device (the station in FIG. 3) can also be calibrated using additional packets as shown in FIG. 4.

Figure 4:
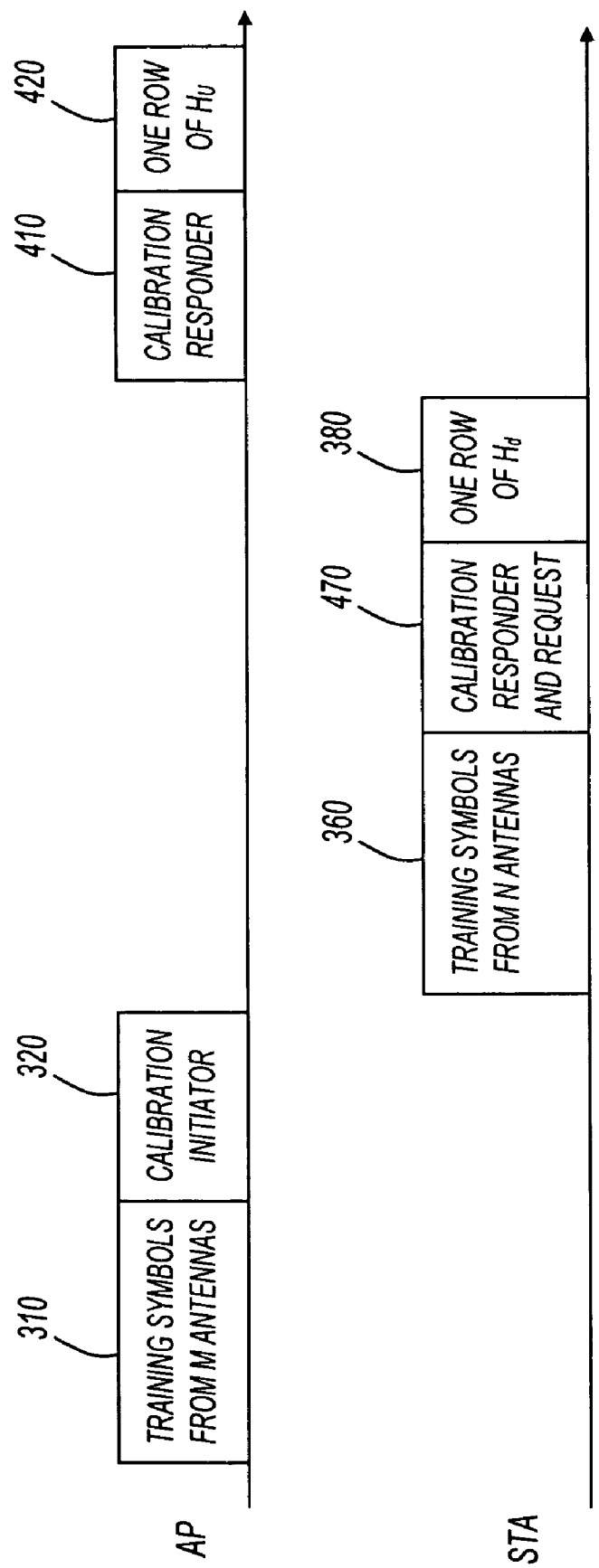
FIG. 4 shows a packet exchange sequence to support calibration of a pair of devices.

FIG. 4 shows a packet exchange sequence to support calibration of a pair of devices. FIG. 4 shows packets 310, 320, and 380, which are described above with reference to FIG. 3. FIG. 4 also shows the station making a request at 470. After the station sends the calibration responder and request 470, and the one row of $H_d$, the AP responds with a calibration responder packet 410 and one or more packets with one row of $H_u$ so that the station can calibrate its chains using equation (9). In some embodiments, the AP may turn on only one receive chain and receive n training symbols from n STA antennas and send back $H_u$ that has only one row. As a result, equation (4) may be satisfied. For example, a receiver gain may be modified using an AGC circuit, a digitally controlled gain circuit, or any other suitable mechanism. Likewise, a transmitter gain may be modified by pre-processing digital data to be transmitted, controlled amplifier gain, or any other suitable mechanism. When equation (4) is satisfied, or approximately satisfied, the station transmit/receive chains are said to be calibrated.

Figure 5:
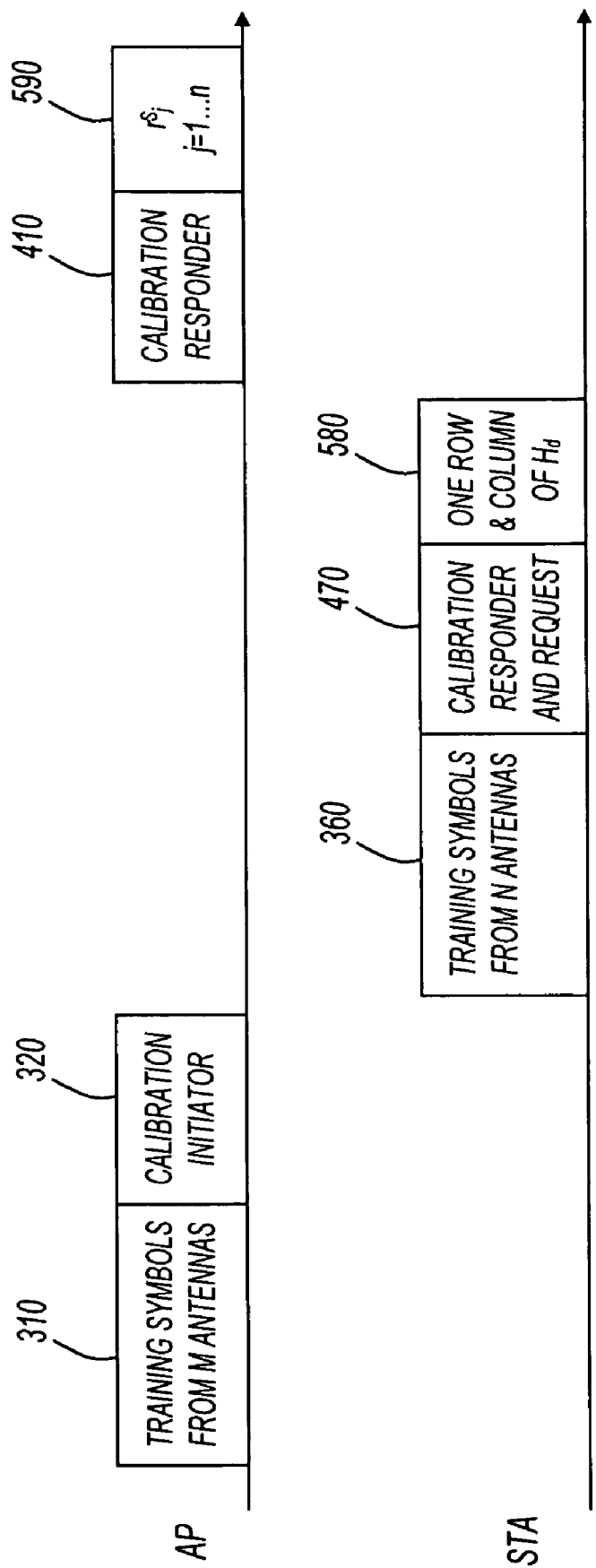
FIG. 5 shows a communications sequence in support of joint calibration of a pair of devices.

FIG. 5 shows a communications sequence in support of joint calibration of a pair of devices. "Joint calibration" refers to one AP or station performing calibration calculations for more than one AP or station. For example, as illustrated in FIG. 5, an AP may perform calibration calculations in both equations (8) and (9). As shown in FIG. 5, the station may feed back more information to facilitate joint calibration or to improve the calibration accuracy. For example, the STA can feedback one row and one column of $H_d$. The AP may then adjust its transmit and/or receive gain to satisfy equation (8). The AP can also use equation (9) to calculate the mismatch for the station and feedback the calibration parameters $r_j^S$ for j=1, ... n at 590 so that the stations don't need to compute the parameters.

In some embodiments, instead of $r_j^S$, the AP may feedback the ratios of $r_j^S$ to $r_{j_0}^S$, where $j_0$ is a constant integer and $j \neq j_0$. For example, the AP may feedback $$\frac{r_j^S}{r_1^S} \text{ for } j = 2, \dots, n.$$

This reduces the feedback overhead by one number. In fact, both the sequence of $r_i^A$ and the sequence of $r_j^S$ can only be determined up two unknown scaling factors $r_{i_0}^A$ and $r_{j_0}^S$ respectively. Therefore, sending the sequence of ratios $$\frac{r_j^S}{r_1^S} \text{ for } j = 2, \dots, n \text{ or } \frac{r_i^A}{r_1^A} \text{ for } i = 2, \dots, m$$

is sufficient.

Figure 6:
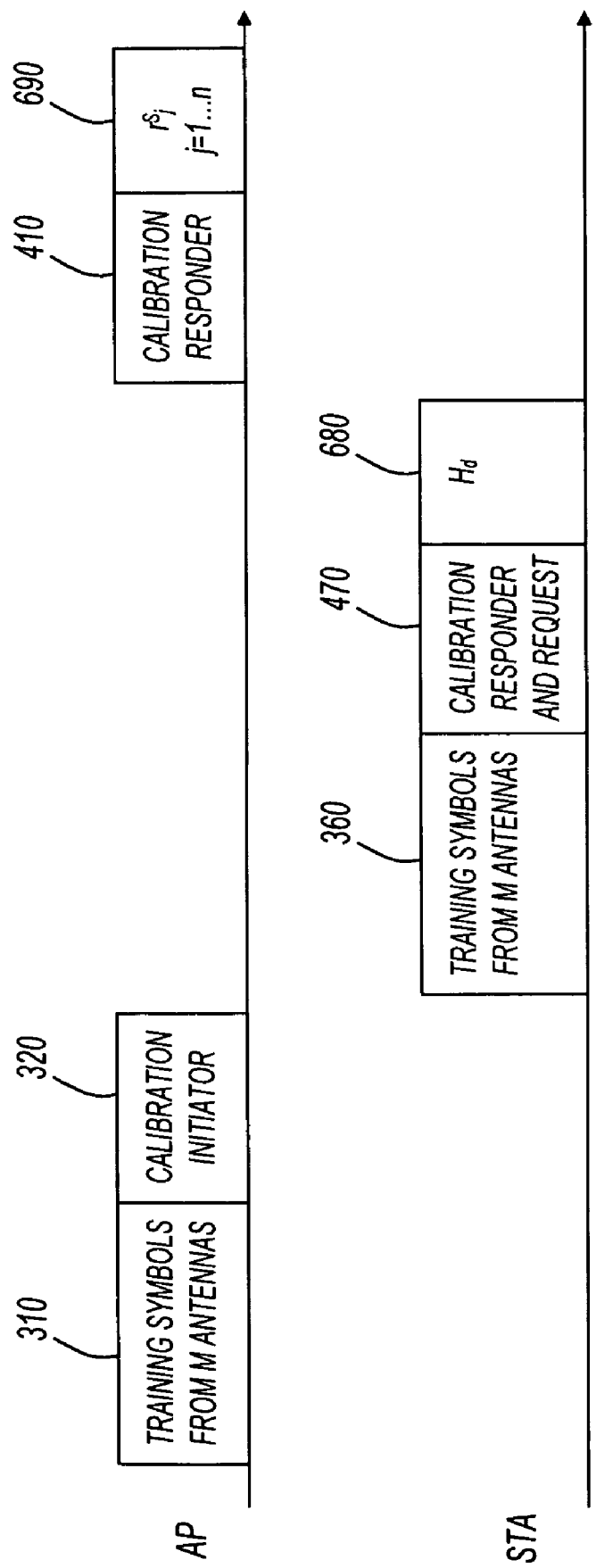
FIG. 6 shows a communications sequence with channel matrix feedback.

FIG. 6 shows a communications sequence with channel matrix feedback. As shown in FIG. 6, the station feeds back the complete channel matrix $H_d$, which can be used to determine the $$\frac{r_i^A}{r_1^A} \text{ for } i = 2, \dots, m$$

with a higher accuracy. For example, equation (8) can be solved n times, with label 1 replaced by j=2, ..., n. The AP may also solve equation (9) with a higher accuracy, and send back the calibration parameters $r_j^S$ for j=1, ..., n or $$\frac{r_j^S}{r_1^S} \text{ for } j = 2, \dots, n$$

at 690 with higher accuracy.

The various embodiments represented by FIG. 6 are many and varied. For example, the AP feedback 690 packet may also include the complete $H_u$ matrix to make operations more symmetric between AP and STA and simplify the protocols.

Figure 7:
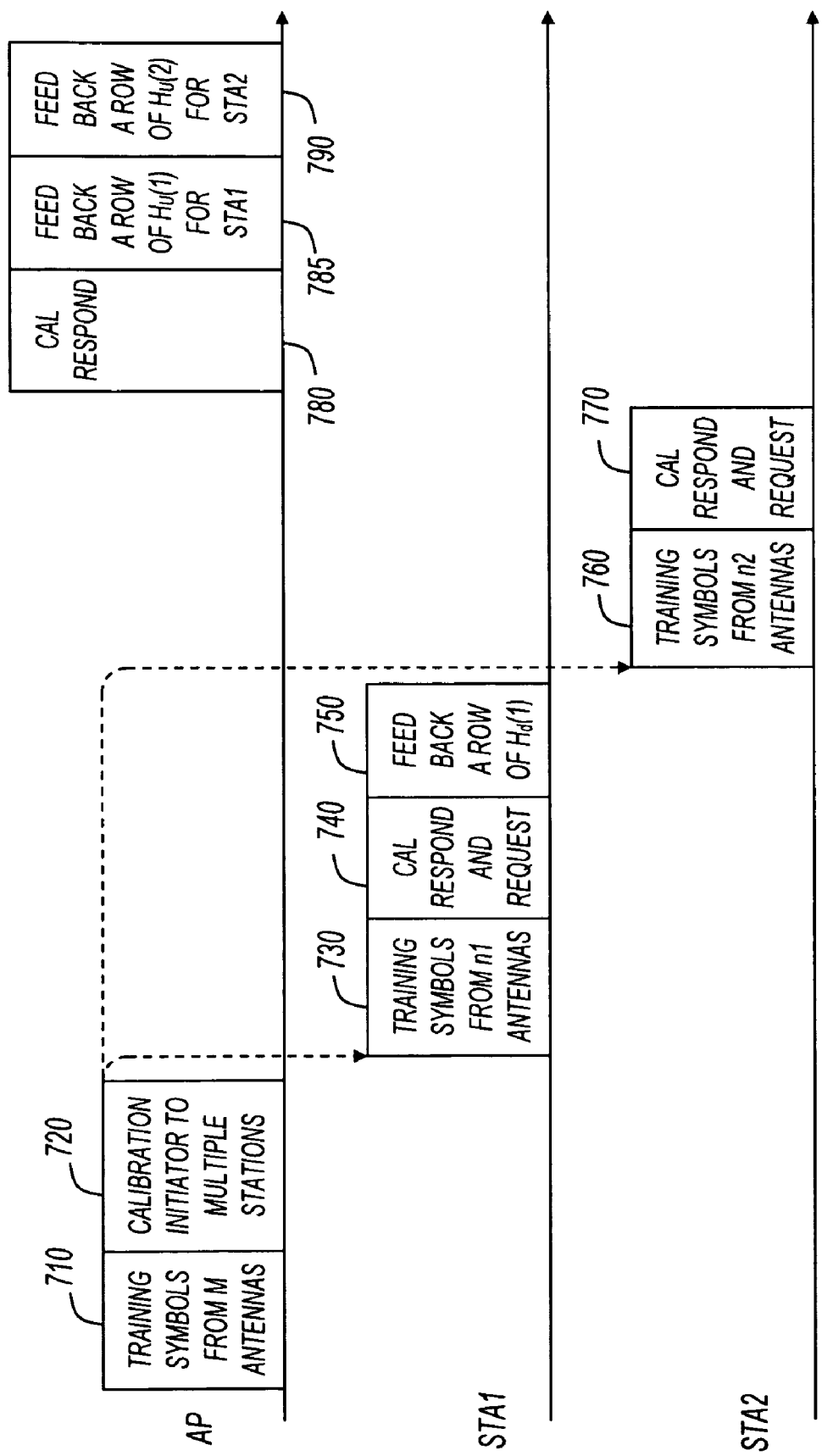
FIG. 7 shows a communications sequence in support of calibration of multiple stations.

FIG. 7 shows a communications sequence in support of calibration of multiple stations. For example, in an infrastructure configuration of a wireless system, an access point may communicate with multiple stations. The access point may perform calibration operations for multiple stations to reduce system overhead. For example, in some embodiments, the AP may periodically calibrate all wakeup devices every 1000 beacon packets or longer in an 802.11 system. The time scale may be set by the response drift of the circuits. The AP broadcasts m training symbols at 710 using its m antennas and schedules the responses for M stations using a calibration initiation packet 720. In the example of FIG. 7, M=2. Each of the M stations sequentially sends $n_i$ training symbols using its $n_i$ antennas and only one of the stations needs to send back one row of its downlink response matrix $H_d$. For example, as shown in FIG. 7, STA 1 sends back training symbols at 730, a calibration responder and request at 740, and a row of its downlink response matrix $H_d$ at 750. Also for example, STA 2 sends back training symbols at 760 and a calibration responder and request at 770 without sending back its downlink response matrix $H_d$. Then, the AP sends back a calibration responder packet at 780, and one row of the uplink response matrix (or the computed calibration ratios) for each station.

As a special case for MIMO, the station with only one antenna doesn't need any calibration for itself. In some embodiments, this may be used for spatial division multiple access (SDMA) systems, where only one station may be calibrated.

The various embodiments represented in FIG. 3-7 are not mutually exclusive, and various elements from one may be utilized in another without departing from the scope of the present invention. For example, when calibrating multiple stations, an AP may request any type of feedback from one or more stations, and may provide any type of feedback or calibration information to one or more stations.

Figure 8:
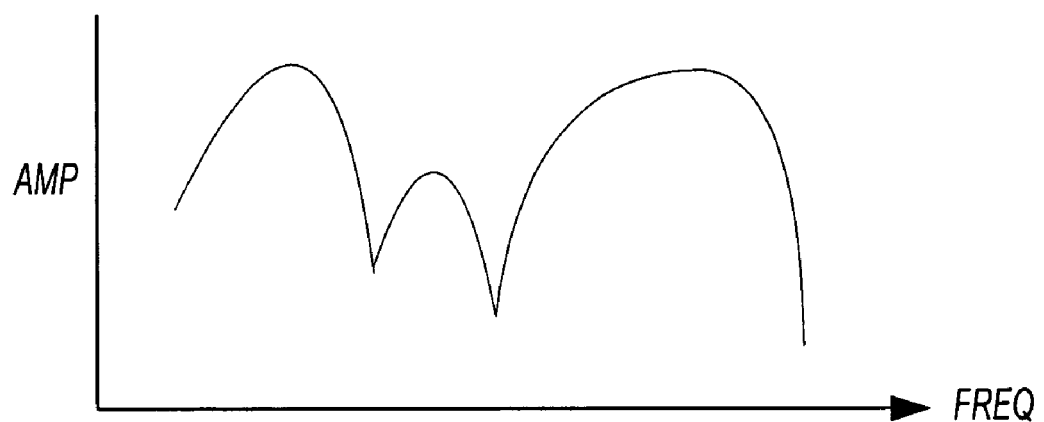
FIG. 8 shows a hypothetical frequency response of a wireless channel.
Figure 9:
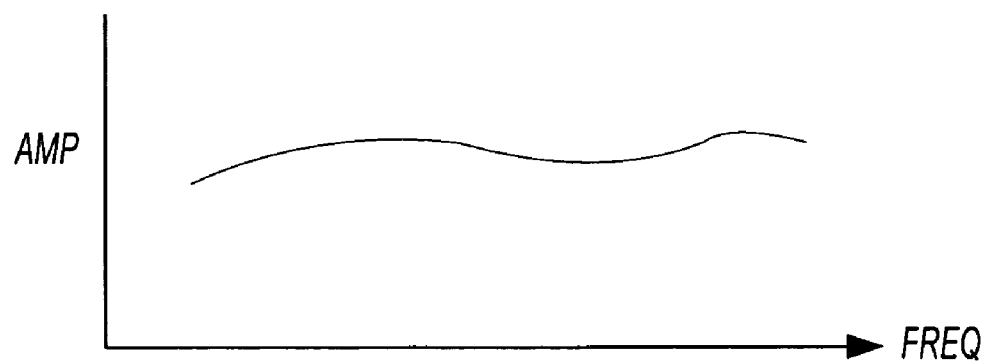
FIG. 9 shows a hypothetical frequency response of a circuit.

FIG. 8 shows a hypothetical frequency response of a wireless channel, and FIG. 9 shows a hypothetical frequency response of a circuit. FIG. 9 may represent a frequency response of a transmit circuit or a receive circuit such as those shown in FIG. 2. The response of a wireless channel can be very frequency selective, namely not flat, due to multipath delays, while the frequency response of both transmit and receive chains may be relatively flat. Various embodiments of the present invention exploit the flatness of the circuit response to further reduce the amount of calibration feedback.

Taking into account the noise and the frequency dependence, equations (5) and (6) may be rewritten as follows.

$$h_{ij}^d(k) = \alpha_i^A(k) h_{ij}(k) \beta_j^S(k) + n_{ij}^d(k) \quad (10)$$

$$h_{ji}^u(k) = \beta_i^A(k) h_{ij}(k) \alpha_j^S(k) + n_{ji}^u(k) \quad (11)$$

where k is the OFDM sub-carrier index, and $n_{ij}^d(k)$ and $n_{ji}^u(k)$ are the additive white Gaussian noise in the downlink and uplink for the k-th sub-carrier. Accordingly, equation (7) may also be rewritten as $$l_{ij}(k) = \frac{r_i^A(k)}{r_j^S(k)} + v_{ij}(k) \quad (12)$$

where $v_{ij}(k)$ is an approximate white Gaussian noise. Since the frequency selectivity of the first term of equation (12) depends only on the transmit and receive circuit, it has the flatness as shown in FIG. 9. Down-sampling in the frequency domain can be applied to $r_i^A(k)$ and $r_j^S(k)$ to take advantage of the flat response and to reduce feedback overhead. Further, low pass filtering or moving averaging can be applied to $h_{ij}^d(k)$ in equation (10) and $h_{ji}^u(k)$ in equation (11) to mitigate the white noise. As a result, feedback can include the downlink or uplink response for less than all sub-carriers. In embodiments that reduce feedback by exploiting the relatively flat circuit frequency response, the feedback data in FIG. 3, 4, or 5 may be computed as follows.

1. Select a row of $H_d(k)$ or $H_u(k)$.
2. Low pass filter the measured link responses $h_{ij}^d(k)$ or $h_{ji}^u(k)$ for k=1, ..., N, where N is the number of subcarriers.
3. Down-sample the filtered sequence.
4. Feedback the samples.

Figure 11:
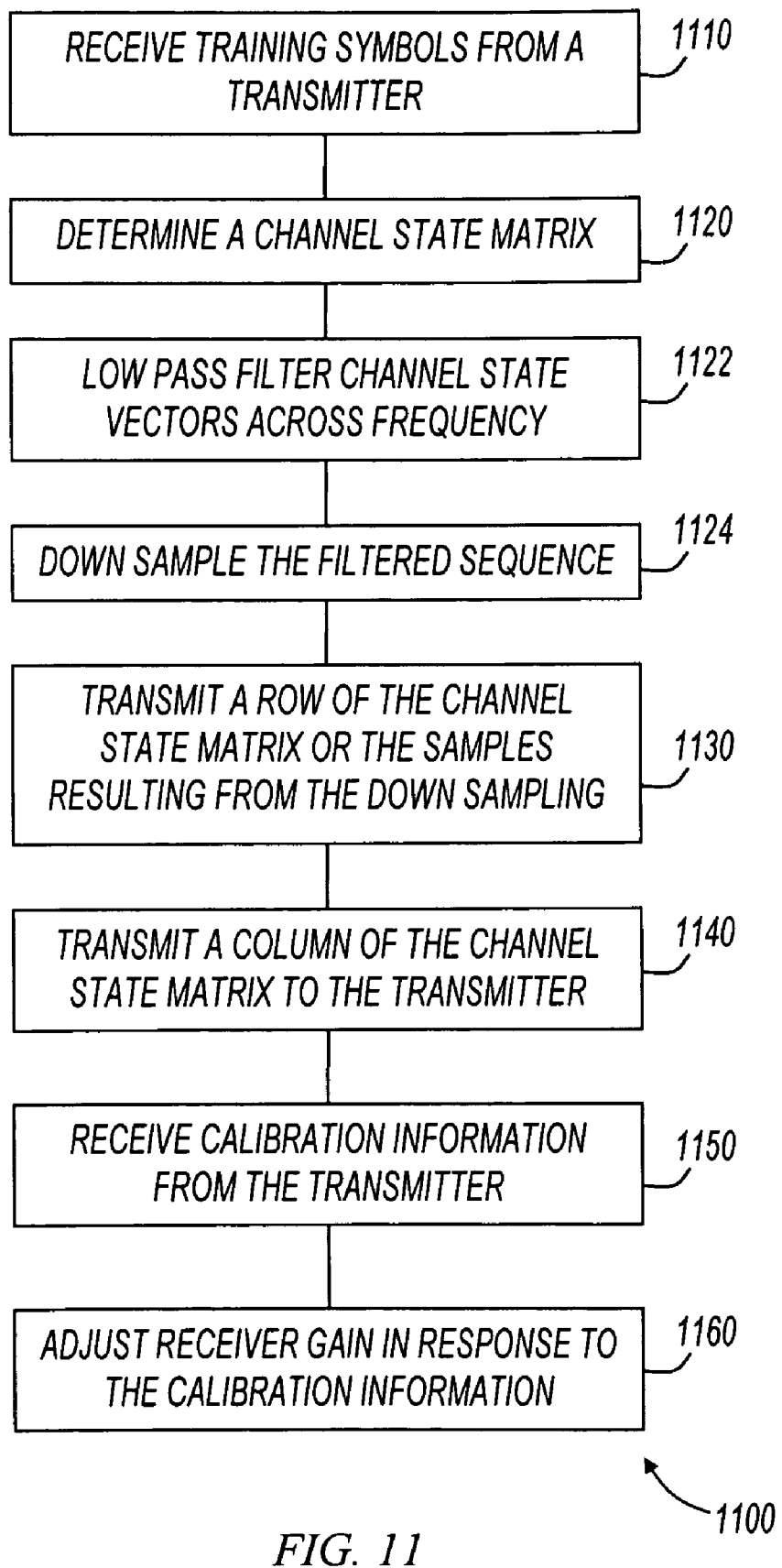

These actions are shown in FIG. 11 at 1122, 1124, and 1130.

In the case where the circuit responses do not change with frequency, i.e. $r_i^A(k) = r_i^A(0)$, k=1 ... N, where N is the number of subcarriers, we can feedback $\langle h_{ij}^d(k) \rangle_k$, where $\langle \rangle_k$ is an average over all subcarriers k.

Taking advantage of the relatively flat frequency characteristic of the transmit/receive chains may significantly reduce the feedback overhead by taking advantage of the following facts: the feedback does not need to be subcarrier by subcarrier since the circuit change varies with frequency very slowly compared to overall channel state information; and the circuits responses vary slowly over time, so the calibration can be done every seconds or even longer. On the other hand, the frequency characteristic of the wireless channel may change on a much faster time scale.

Figure 10:
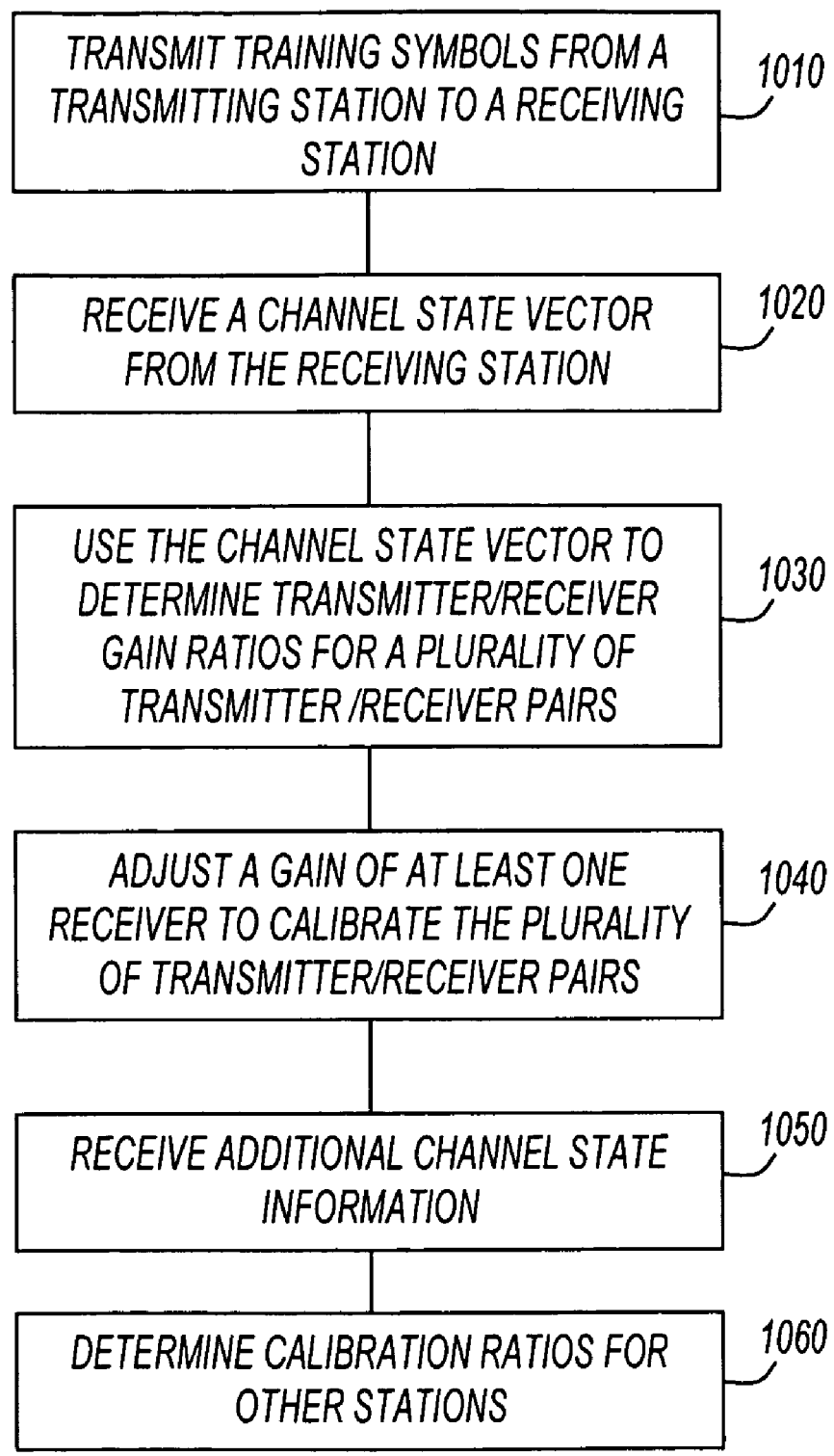
FIGS. 10 and 11 show flowcharts in accordance with various embodiments of the present invention.

FIG. 10 shows a flowchart in accordance with various embodiments of the present invention. In some embodiments, method 1000 may be used in, or for, a wireless system that utilizes MIMO technology. In some embodiments, method 1000, or portions thereof, is performed by a wireless communications device, embodiments of which are shown in the various figures. In other embodiments, method 1000 is performed by a processor or electronic system. Method 1000 is not limited by the particular type of apparatus or software element performing the method. The various actions in method 1000 may be performed in the order presented, or may be performed in a different order. Further, in some embodiments, some actions listed in FIG. 10 are omitted from method 1000.

Method 1000 is shown beginning at block 1010 in which training symbols are transmitted from a transmitting station to a receiving station. In some embodiments, this may correspond to an access point transmitting training symbols such as those shown at 310 (FIG. 3) to a mobile station in a wireless network. At 1020, a channel state vector is received from the receiving station. This may correspond to an access point receiving one row of the downlink channel state matrix $H_d$, such as that shown at 380 (FIG. 3).

At 1030, the channel state vector is used to determine transmitter/receiver gain ratios for a plurality of transmitter/receiver pairs. For example, as described with reference to FIG. 3, one row of the downlink channel state matrix $H_d$ may be utilized to determine $r_i^A$ for i=1, ..., m. At 1040, a gain of at least one receiver may be adjusted to calibrate the plurality of transmitter/receiver pairs. By adjusting the gain of transmitters and/or receivers, a wireless communications device may create the condition that satisfies equations (3) and/or (4), thereby providing a condition suitable for an assumption of aggregate channel reciprocity.

At 1050, additional channel state information is received. In some embodiments, this may correspond to receiving one column of the downlink channel state matrix $H_d$, as shown in FIG. 5. In other embodiments, this may correspond to receiving an entire downlink channel state matrix, as shown in FIG. 6. In still further embodiments, this may correspond to receiving channel state information from more than one other station. For example, referring now back to FIG. 7, both STA 1 and STA 2 may feed back all or a portion of a downlink channel state matrix. At 1060, calibration ratios are determined for other stations. This may correspond to determining $r_j^S$ over j=1, ..., n for one or more other stations.

FIG. 11 shows a flowchart in accordance with various embodiments of the present invention. In some embodiments, method 1100 may be used in, or for, a wireless system that utilizes MIMO technology. In some embodiments, method 1100, or portions thereof, is performed by a wireless communications device, embodiments of which are shown in the various figures. In other embodiments, method 1100 is performed by a processor or electronic system. Method 1100 is not limited by the particular type of apparatus or software element performing the method. The various actions in method 1100 may be performed in the order presented, or may be performed in a different order. Further, in some embodiments, some actions listed in FIG. 11 are omitted from method 1100.

Method 1100 is shown beginning at block 1110 in which training symbols are received from a transmitter. In some embodiments, this may correspond to a station receiving training symbols such as those shown at 310 (FIG. 3). At 1120, the channel state matrix is determined. The channel state matrix may include the downlink channel state matrix $H_d$, or an uplink channel state matrix $H_u$.

At 1130, a row of the channel state matrix is transmitted to the transmitter. In some embodiments, this may correspond to a station sending one more packets such as those shown at 380 (FIG. 3). At 1140, a column of the channel state matrix is transmitted to the transmitter. This may correspond to additional channel state information being transmitted, such as that shown at 580 (FIG. 5).

At 1150, calibration information is received from the transmitter. This may correspond to receiving transmitter/receiver gain ratios $r_j^S$ over j=1, . . . , n from the transmitter. At 1160, receiver gain is adjusted in response to the calibration information.

Figure 12:
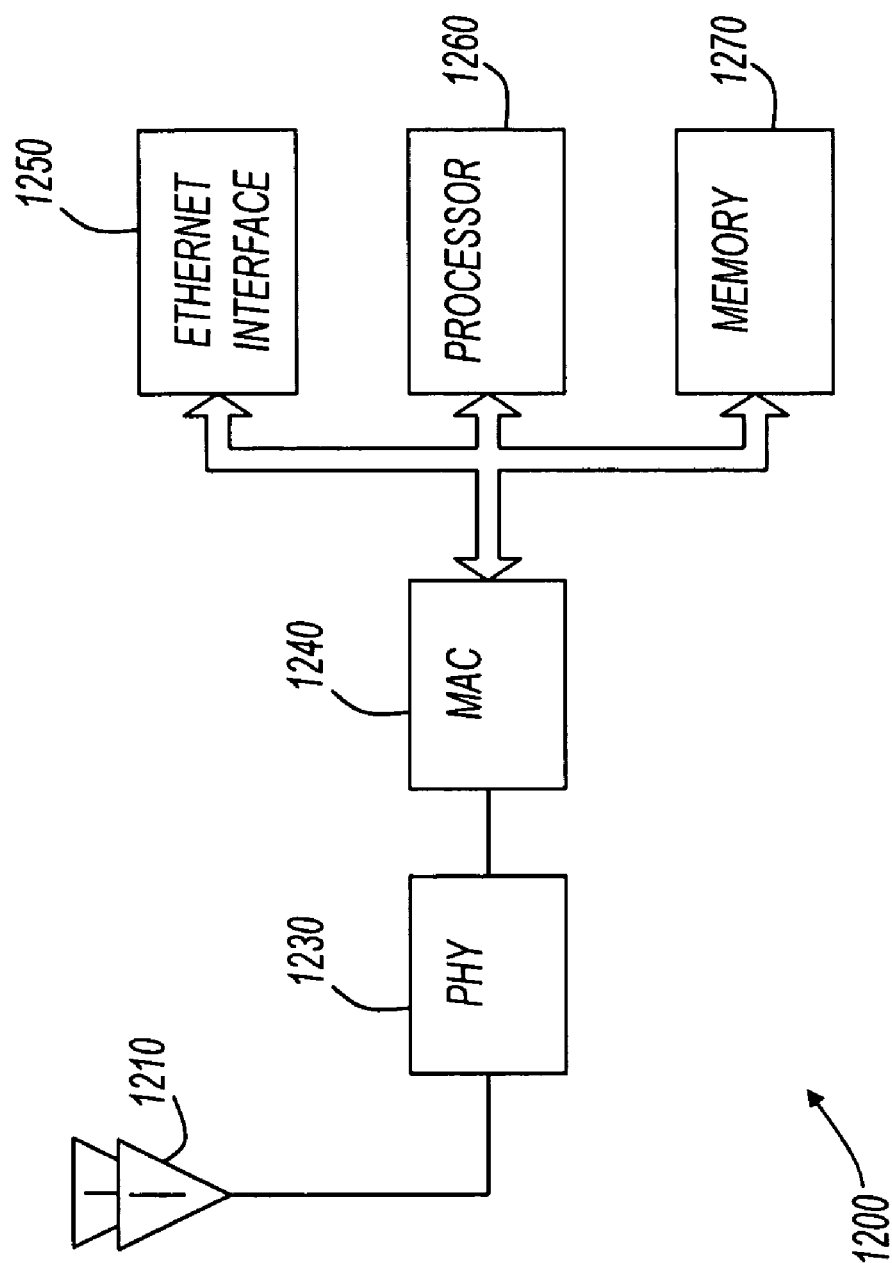
FIG. 12 shows an electronic system in accordance with various embodiments of the present invention.

FIG. 12 shows a system diagram in accordance with various embodiments of the present invention. Electronic system 1200 includes antennas 1210, physical layer (PHY) 1230, media access control (MAC) layer 1240, Ethernet interface 1250, processor 1260, and memory 1270. In some embodiments, electronic system 1200 may be a station capable of transmitting training symbols, determining channel state matrices, and calibrating transmitter/receiver chains as described above with reference to the previous figures. In other embodiments, electronic system 1200 may be a station that receives training symbols, provides channel state information, and receives calibration information in a MIMO system. For example, electronic system 1200 may be utilized in a wireless network as station 102 or station 104 (FIG. 1). Also for example, electronic system 1200 may be a station capable of performing the calculations shown in any of the equations above.

In some embodiments, electronic system 1200 may represent a system that includes an access point or mobile station as well as other circuits. For example, in some embodiments, electronic system 1200 may be a computer, such as a personal computer, a workstation, or the like, that includes an access point or mobile station as a peripheral or as an integrated unit. Further, electronic system 1200 may include a series of access points that are coupled together in a network.

In operation, system 1200 sends and receives signals using antennas 1210, and the signals are processed by the various elements shown in FIG. 12. Antennas 1210 may be an antenna array or any type of antenna structure that supports MIMO processing. System 1200 may operate in partial compliance with, or in complete compliance with, a wireless network standard such as an 802.11 standard.

Physical layer (PHY) 1230 is coupled to antennas 1210 to interact with a wireless network. PHY 1230 may include circuitry to support the transmission and reception of radio frequency (RF) signals. For example, in some embodiments, PHY 1230 includes RF receiver chains to receive signals and perform "front end" processing such as low noise amplification (LNA), filtering, frequency conversion or the like. Further, in some embodiments, PHY 1230 includes transform mechanisms and beamforming circuitry to support MIMO signal processing. Also for example, in some embodiments, PHY 1230 includes circuits to support frequency up-conversion, and RF transmitter chains. In addition, PHY 1230 may include variable gain circuits that allow for calibrating transmitter/receiver gain as described above with reference to the previous figures.

Media access control (MAC) layer 1240 may be any suitable media access control layer implementation. For example, MAC 1240 may be implemented in software, or hardware or any combination thereof. In some embodiments, a portion of MAC 1240 may be implemented in hardware, and a portion may be implemented in software that is executed by processor 1260. Further, MAC 1240 may include a processor separate from processor 1260.

In operation, processor 1260 reads instructions and data from memory 1270 and performs actions in response thereto. For example, processor 1260 may access instructions from memory 1270 and perform method embodiments of the present invention, such as method 1000 (FIG. 10) or method 1100 (FIG. 11) or methods described with reference to other figures. Processor 1260 represents any type of processor, including but not limited to, a microprocessor, a digital signal processor, microcontroller, or the like.

Memory 1270 represents an article that includes a machine readable medium. For example, memory 1270 represents a random access memory (RAM), dynamic random access memory (DRAM), static random access memory (SRAM), read only memory (ROM), flash memory, or any other type of article that includes a medium readable by processor 1260. Memory 1270 may store instructions for performing the execution of the various method embodiments of the present invention. Memory 1270 may also store channel state matrices or calibration information.

Although the various elements of system 1200 are shown separate in FIG. 12, embodiments exist that combine the circuitry of processor 1260, memory 1270, Ethernet interface 1250, and MAC 1240 in a single integrated circuit. For example, memory 1270 may be an internal memory within processor 1260 or may be a microprogram control store within processor 1260. In some embodiments, the various elements of system 1200 may be separately packaged and mounted on a common circuit board. In other embodiments, the various elements are separate integrated circuit dice packaged together, such as in a multi-chip module, and in still further embodiments, various elements are on the same integrated circuit die.

Ethernet interface 1250 may provide communications between electronic system 1200 and other systems. For example, in some embodiments, electronic system 1200 may be an access point that utilizes Ethernet interface 1250 to communicate with a wired network or to communicate with other access points. Some embodiments of the present invention do not include Ethernet interface 1250. For example, in some embodiments, electronic system 1200 may be a network interface card (NIC) that communicates with a computer or network using a bus or other type of port.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
    transmitting training symbols from a transmitting station having a first plurality of transmitter/receiver pairs to a receiving station having a second plurality of transmitter/receiver pairs;
    receiving a channel state vector from the receiving station, wherein the channel state vector comprises only a row vector of a channel state matrix determined by the receiving station; and
    determining a ratio of transmitter gain to receiver gain for each of the first plurality of transmitter/receiver pairs in terms of a ratio of transmitter gain to receiver gain for one of the first plurality of transmitter/receiver pairs.

2. The method of claim 1 further comprising adjusting a gain value to calibrate the first plurality of transmitter/receiver pairs.

3. The method of claim 1 wherein receiving a channel state vector further comprises receiving a column vector of the channel state matrix determined by the receiving station.

4. The method of claim 3 further comprising using the column vector to determine transmitter gain to receiver gain ratios for each of the second plurality of transmitter/receiver pairs in terms of a transmitter gain to receiver gain ratio for one of the second plurality of transmitter/receiver pairs.

5. The method of claim 4 further comprising sending the ratios for each of the second plurality of transmitter/receiver pairs to the receiving station.

6. The method of claim 1 wherein sending training symbols comprises sending training symbols to multiple receiving stations.

7. The method of claim 6 wherein receiving a channel state vector comprises receiving at least one channel state vector from each of the multiple receiving stations.

8. The method of claim 7 further comprising determining transmitter gain to receiver gain ratios for a plurality of transmitter/receiver pairs for the multiple receiving stations.

9. The method of claim 1 further comprising:
    receiving training symbols from the receiving station; and
    transmitting a second channel state vector to the receiving station.

10. The method of claim 9 wherein transmitting a second channel state vector comprises:
    low pass filtering channel state vectors across frequency to create a filtered sequence;
    down sampling the filtered sequence; and
    transmitting samples resulting from down sampling.

11. A method comprising:
    receiving training symbols from a transmitter having a first plurality of transmitter/receiver pairs;
    determining a channel state matrix from the training symbols;
    transmitting a row of the channel state matrix to the transmitter;
    transmitting training symbols to the transmitter using a plurality of transmitters that are part of a second plurality of transmitter/receiver pairs;
    receiving a row of a different channel state matrix; and
    determining transmitter gain to receiver gain ratios for each of the second plurality of transmitter/receiver pairs in terms of a transmitter gain to receiver gain ratio of one of the second plurality of transmitter/receiver pairs.

12. The method of claim 11 further comprising transmitting a column of the channel state matrix to the transmitter.

13. The method of claim 12 further comprising receiving calibration information from the transmitter.

14. The method of claim 11 further comprising adjusting gain values to make the transmitter gain to receiver gain ratios substantially equal.

15. The method of claim 11 wherein determining a channel state matrix comprises:
    low pass filtering channel state vectors across frequency to create a filtered sequence; and
    down sampling the filtered sequence.

16. A computer-readable medium on which is stored computer instructions which, when executed by a computer, cause the computer to perform:
    transmitting training symbols from a transmitting station having a first plurality of transmitter/receiver pairs to a receiving station having a second plurality of transmitter/receiver pairs, receiving a channel state vector from the receiving station, wherein the channel state vector comprises only a row vector of a channel state matrix determined by the receiving station, and determining a ratio of transmitter gain to receiver gain for each of the first plurality of transmitter/receiver pairs in terms of a ratio of transmitter gain to receiver gain for one of the first plurality of transmitter/receiver pairs.

* * * * *